(No Model.)
S. SHOEMAKER.
REVOLVING HARROW.
No. 517,365. Patented Mar. 27, 1894.
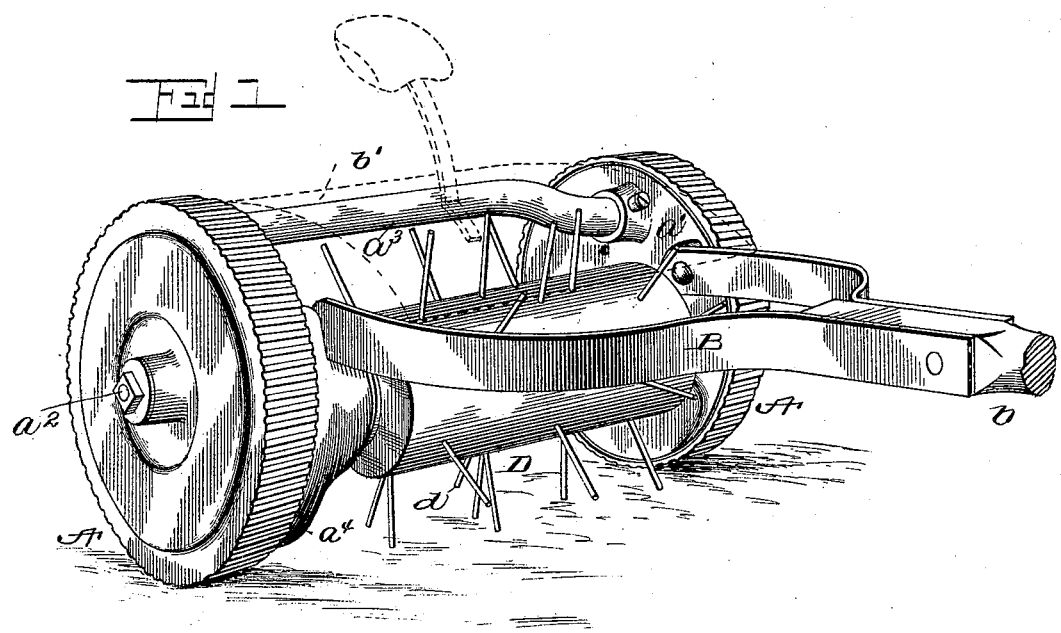
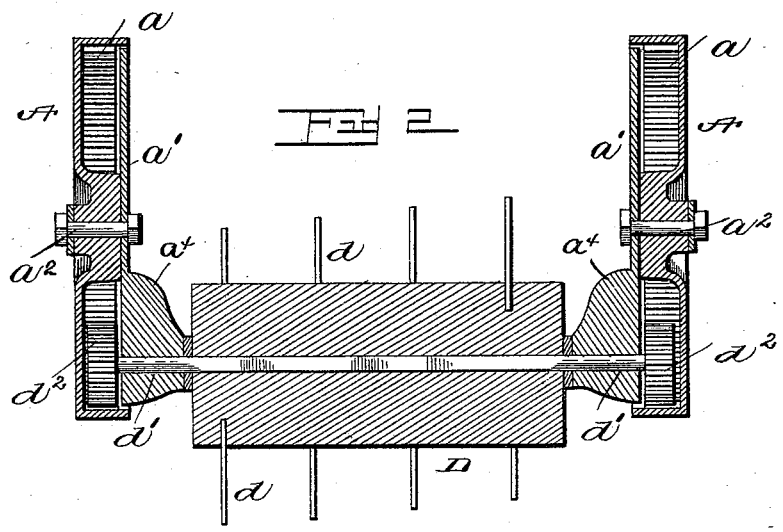
Witnesses
Inventor
By his Attorney
THE NATIONAL LITHOGRAPHING COMPANY,
WASHINGTON, D. C.

UNITED STATES PATENT OFFICE.

SIMON SHOEMAKER, OF SHASTA, CALIFORNIA, ASSIGNOR OF ONE-HALF TO JOHN R. H. SMITH, OF SAME PLACE.

REVOLVING HARROW.

SPECIFICATION forming part of Letters Patent No. 517,365, dated March 27, 1894.

Application filed June 2, 1892. Renewed February 12, 1894. Serial No. 499,976. (No model.)

*To all whom it may concern:*

Be it known that I, SIMON SHOEMAKER, of Shasta, in the county of Shasta and State of California, have invented certain new and useful Improvements in Revolving Harrows; and I do hereby declare the following to be a full, clear, and exact description of the invention, such as will enable others skilled in the art to which it appertains to make and use the same.

This invention relates to a new and improved revolving harrow, and has for its object the production of a cheap, simple and highly efficient harrow of this kind in which the cylinder shall be continuously revolved in the movement of the harrow.

The invention comprises a harrow of the peculiar construction, combination and arrangement of parts, substantially as hereinafter fully set forth and particularly pointed out in the claim.

In the accompanying drawings:—Figure 1 is a view in perspective of my improved harrow. Fig. 2 is a horizontal sectional view.

Referring to the drawings, A, A, designate the main carrying wheels, the peripheries of which are corrugated on their outer surfaces, while from their inner surfaces project cogs $a$. To the inner sides of these wheels A are secured disks $a'$, the same being firmly held by the central nutted bolts $a^2$. To these disks $a'$ are secured the ends of a cross-bar $a^3$, which is slightly bent at said ends so that its main portion will project outward and upward. To these disks are also secured the inner ends of hounds B, a tongue $b$ being attached to the outer ends of the latter. A platform $b'$ is connected to cross-bar $a^3$ and hounds B to support a driver's seat, all of which features are shown in dotted lines, Fig. 1.

D is the harrow cylinder from which project the harrow teeth $d$. From the ends of this cylinder extend journals $d'$ which are projected through apertures in thickened portions $a^4$ of disks $a'$; and upon them are keyed cog-wheels $d^2$ which intermesh with the cogs $a$ of wheels A. The revolution of the latter wheels will impart motion to cog-wheels $d^2$, and effect the turning of the harrow cylinder D.

From what has been said it will be seen that my improved harrow is extremely simple and inexpensive in construction, and that the toothed cylinder is positive in its operation, and that the device being free from all complicated mechanism is not liable to readily get out of order or be deranged.

I claim as my invention—

The herein-described harrow, comprising the carrying-wheels having cogs in their inner peripheries, the disks over the inner faces of said wheels having lower thickened portions, the nutted bolts holding said disks to said wheels, the hounds secured at their inner ends to said disks, the cross-bar curved at its ends and secured to said disks, the rotary cylinder having its shaft journaled in said thickened portions and the cog-wheels on the ends of said shaft gearing with the cogs of said carrying wheels, substantially as set forth.

In testimony whereof I have signed this specification in the presence of two subscribing witnesses.

SIMON SHOEMAKER.

Witnesses:
FRITZ HARTMANN,
JAMES CARTER.